(12) United States Patent
Lopp et al.

(10) Patent No.: US 6,386,226 B1
(45) Date of Patent: May 14, 2002

(54) SINGLE HANDLE LAVATORY FAUCET WITH HANDLE COLLAR FOR SEATING VALVE ASSEMBLY

(75) Inventors: Darren S. Lopp, Westlake; David Stech, Strongsville; Sharon M. Vilagi, Grafton, all of OH (US)

(73) Assignee: Moen Incorporated, North Olmsted, OH (US)

( * ) Notice: Subject to any disclaimer, the term of this patent is extended or adjusted under 35 U.S.C. 154(b) by 0 days.

(21) Appl. No.: 09/784,406

(22) Filed: Feb. 15, 2001

(51) Int. Cl.[7] .............................................. F16K 27/00
(52) U.S. Cl. .............................. 137/454.6; 137/315.13; 137/315.15
(58) Field of Search ...................... 137/315.13, 315.15, 137/454.5, 454.6

(56) References Cited

U.S. PATENT DOCUMENTS

| | | | | |
|---|---|---|---|---|
| 3,003,519 A | * | 10/1961 | Homeyer et al. | 137/454.6 |
| 4,481,971 A | * | 11/1984 | Farrell et al. | 137/315.05 |
| 4,685,487 A | * | 8/1987 | Derdack et al. | 137/315.13 |
| 5,613,521 A | * | 3/1997 | Knapp | 137/454.6 |

\* cited by examiner

*Primary Examiner*—Stephen M. Hepperle
(74) *Attorney, Agent, or Firm*—Cook, Alex, McFarron, Manzo, Cummings & Mehler, Ltd.

(57) ABSTRACT

A faucet includes a housing with a valve body assembly having a valve body positioned within the housing. There is a water inlet connection for the valve body and a water outlet connection for the valve body. A handle collar is seated on the housing and has an interior surface which is formed and adapted to attach to and support the valve body within the housing. A valve is positioned within a cavity in the valve body. The valve has an outwardly extending stem and there is a handle attached to the valve stem. A valve retainer is threadedly attached to the valve body to hold the valve within the valve body cavity.

7 Claims, 1 Drawing Sheet

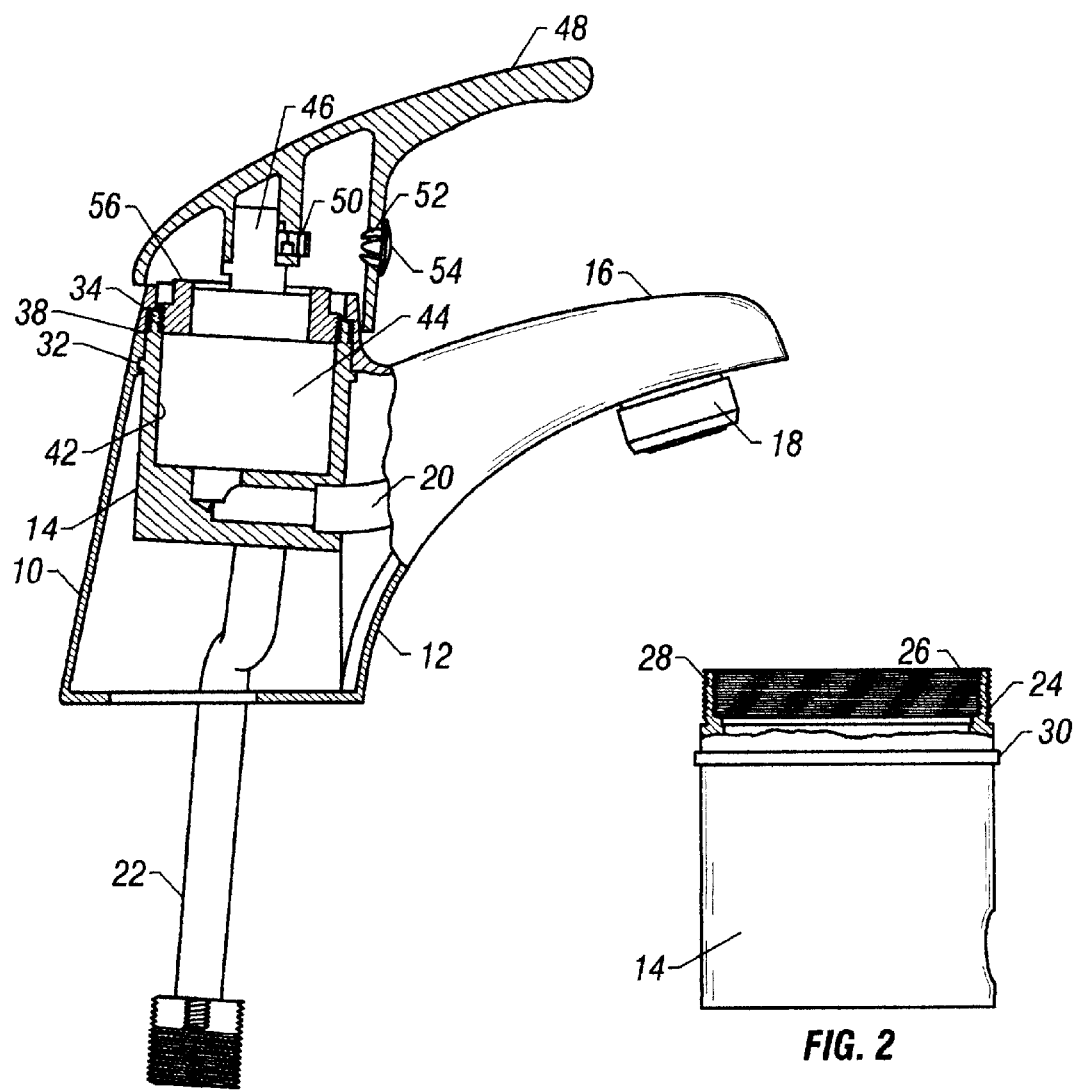
FIG. 1
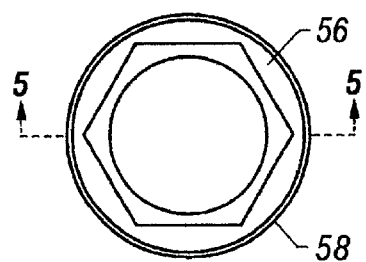
FIG. 2
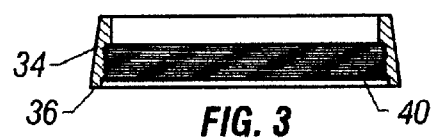
FIG. 3
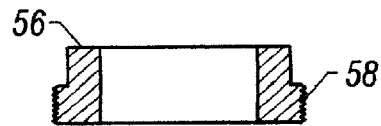
FIG. 4
FIG. 5

SINGLE HANDLE LAVATORY FAUCET WITH HANDLE COLLAR FOR SEATING VALVE ASSEMBLY

THE FIELD OF THE INVENTION

The present invention relates to single handle mixing faucets and more specifically to a simplified mounting for the faucet valve cartridge to permit easy access and removal. Although the invention will be described in connection with a single handle mixing faucet, the invention has wider use and may also be applicable to other water control valve assemblies, for example those used in two-handle faucets, as well as shower and/or tub control valves.

Specifically, the present invention utilizes the handle collar, a visible portion of the faucet construction to support a valve body assembly in relation to the exterior housing or escutcheon, thus eliminating the need for additional fasteners or fastening plates as are commonly used in other faucets having mixing cartridges whether they be of the ceramic type or otherwise. The present invention provides complete access for removal and replacement of the valve cartridge by removal of a single nut which holds the cartridge within the valve body assembly. The design is specifically directed to simplifying the construction and thus the cost of single handle mixing faucets.

SUMMARY OF THE INVENTION

The present invention relates to mixing faucets and more particularly to an improved mounting arrangement for the valve assembly and valve cartridge of such a faucet.

A primary purpose of the invention is a faucet construction in which a handle collar is used to support the valve assembly within the outer housing or escutcheon with a retainer nut, threadedly attached to the valve body being used to hold the valve cartridge within the valve body.

Another purpose of the invention is to provide a simplified faucet design in which it is only necessary to remove a single element to have access to the valve cartridge.

Another purpose of the invention is to provide a faucet construction as described in which the handle collar is both decorative and performs the function of holding the valve body assembly within the faucet housing.

Other purposes will appear in the ensuing specification, drawings and claims.

BRIEF DESCRIPTION OF THE DRAWINGS

The invention is illustrated diagrammatically in the following drawings wherein:

FIG. 1 is a side view, in part section, illustrating the faucet of the present invention;

FIG. 2 is a side view, in part section, of the valve body assembly;

FIG. 3 is an axial section through the handle collar;

FIG. 4 is a top view of the valve retainer; and

FIG. 5 is a section along plane 5—5 of FIG. 4.

DESCRIPTION OF THE PREFERRED EMBODIMENT

The present invention will be described in connection with a single handle mixing faucet. However, the construction and the concepts disclosed herein are equally applicable to the mounting of other types of water control valves, for example, as in a two handle faucet, or a tub and shower control.

The exterior of the faucet illustrated in FIG. 1 is formed by an escutcheon or housing 10 and a throat plate 12. The housing 10 extends peripherally about a valve body assembly 14 and has a spout 16, with the underside of the spout being formed by the throat plate 12. An aerator is indicated at 18 and will provide for the discharge of water coming through an outlet tube 20 attached to the valve body assembly 14. The inlet connection for the faucet is by a conduit 22 which is connected to the underside of the valve body assembly 14.

The valve body assembly 14 is generally cylindrical in configuration and has, at its upper end thereof, an exterior threaded area 24 and an interior threaded area 26. These threaded areas are on opposite sides of a cylindrical projection 28. The valve body assembly further includes an annular projection 30 which interlocks with an arcuate or annular shoulder 32 on the interior of the housing 10. Thus, when the valve body assembly is positioned within the housing, as illustrated in FIG. 1, the projection 30 will prevent the valve body assembly from being moved outwardly through the top of the housing.

There is a handle collar 34 which has a downwardly facing surface 36 which is seated on top of an upwardly facing surface 38 at the upper end of the housing 10. The handle collar 36 has an interior threaded area 40 which mates with the exterior threaded area 24 on the valve body assembly 14 to thereby mount the valve body assembly and attach it to housing 10. There will be sufficient torque applied to the handle collar to draw the projection 30 up tight against the bottom of the shoulder 32 to rigidly secure the valve body assembly within the housing.

Positioned within a cavity 42 of the valve body assembly 14 is a valve cartridge 44 which has an upwardly extending stem 46. The valve cartridge may be of any suitable type in which movement of the faucet handle controls water volume and temperature. The stem 46 is attached to a faucet handle 48 by means of a set screw 50. There may be an opening 52 within the handle, closed by button 54, to provide access to the set screw to permit removal of the handle from the cartridge stem 46 to provide a means to service the valve cartridge. The valve cartridge 44 is held within the cavity 42 by means of a valve retainer 56 which has an exterior threaded area 58 which mates with the interior threaded area 26 on the valve body assembly.

The present invention is specifically concerned with a simplified and reliable mounting for the valve body assembly in relation to the housing or escutcheon. The handle collar mounts the valve body assembly within the housing and rotation of the collar will draw the valve body up tight against the shoulder on the interior of the housing. The cartridge is retained within a cavity in the valve body by means of a valve retainer nut. This nut is the only element which need be removed, after the handle has been taken off, to permit access to replace the valve cartridge. In prior art constructions the valve body was secured by extra screws or other fastening elements which necessitated a more extensive removal operation to service the valve cartridge. The present invention provides a simplified design and one which reliably holds the valve cartridge and the valve body assembly within the faucet escutcheon, but yet provides for easy access to the valve cartridge.

Whereas the preferred form of the invention has been shown and described herein, it should be realized that there may be many modifications, substitutions and alterations thereto.

The embodiments of the invention in which an exclusive property or privilege is claimed are defined as follows:

1. A faucet including a housing, a valve body assembly including a valve body positioned within said housing, a water inlet connection to said valve body and a water outlet connected to said valve body, a handle collar seated on said housing, said handle collar having an interior surface which is formed and adapted to attach to and support said valve body within said housing, a valve positioned within a cavity in said valve body, said valve having an outwardly extending stem, a handle attached to said valve stem, and a valve retainer threadedly attached to said valve body to hold said valve within said valve body cavity.

2. The faucet of claim 1 wherein the handle collar interior surface is threadedly attached to a threaded surface on the exterior of said valve body.

3. The faucet of claim 2 wherein the threaded connection between the handle collar and the valve body is directly adjacent the threaded connection between the valve body and the valve retainer, with the threaded connection between the valve body and the valve retainer being on the inside of the valve body.

4. The faucet of claim 2 wherein said handle collar has a downwardly facing surface and said housing has an upwardly facing surface, with said handle collar downwardly facing surfaces being seated on the upwardly facing surface of said housing.

5. The faucet of claim 1 wherein said valve body has an outwardly facing projection, at least in part peripherally extending about said valve body, said housing interior having a shoulder formed and adapted to cooperate with said valve body projection to retain said valve body within said housing.

6. The faucet of claim 1 further including a throat plate attached to and forming a portion of said faucet.

7. A single handle mixing faucet including a hollow housing having a spout portion thereof, a throat plate attached to said housing and forming the underside of a faucet spout, a valve body assembly including a valve body positioned within the interior of said housing and having an inlet water connection and an outlet water connection which extends into said spout, a handle collar having a downwardly facing peripheral surface seated upon an upwardly facing peripheral surface of said housing, a threaded area on the interior of said handle collar and a mating threaded area on an exterior portion of said valve body whereby said collar holds said valve body within said housing, a peripheral projection on an exterior surface of said valve body, and a cooperating shoulder on an interior portion of the housing thereby retaining the valve body within the housing, a valve positioned within a cavity in the valve body, said valve having an outwardly extending stem, a handle attached to said valve stem, and a valve retainer threadedly attached to said valve body on an interior portion thereof, which interior portion is generally coaxial with the exterior threaded portion of the valve body which attaches to the handle collar.

* * * * *